United States Patent
Dunn et al.

(10) Patent No.: US 9,649,977 B2
(45) Date of Patent: May 16, 2017

(54) LED DRIVER FOR VEHICLE DISPLAY ILLUMINATION

(71) Applicant: Continental Automotive Systems, Inc., Auburn Hills, MI (US)

(72) Inventors: Thomas Gregory Dunn, Farmington Hills, MI (US); Sandeep Shrestha, Rochester Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/838,764

(22) Filed: Aug. 28, 2015

(65) Prior Publication Data
US 2015/0367777 A1    Dec. 24, 2015

Related U.S. Application Data

(63) Continuation of application No. 14/273,799, filed on May 9, 2014, now Pat. No. 9,161,411.

(51) Int. Cl.
| | |
|---|---|
| *B60Q 3/02* | (2006.01) |
| *H05B 33/08* | (2006.01) |
| *B60K 35/00* | (2006.01) |
| *G01D 11/28* | (2006.01) |
| *H05B 37/02* | (2006.01) |
| *B60Q 3/04* | (2006.01) |

(52) U.S. Cl.
CPC ............ *B60Q 3/0293* (2013.01); *B60K 35/00* (2013.01); *G01D 11/28* (2013.01); *H05B 33/086* (2013.01); *H05B 33/0845* (2013.01); *H05B 33/0857* (2013.01); *H05B 37/0254* (2013.01); *B60Q 3/048* (2013.01)

(58) Field of Classification Search
CPC .............. H05B 33/0815; H05B 33/086; H05B 33/0845; H05B 33/0857; H05B 37/029; H05B 33/0842; H05B 37/02; H05B 37/0254; B60Q 3/0293; B60Q 3/048
USPC .... 315/77, 291, 294, 307, 312, 82; 307/10.8
See application file for complete search history.

(56) References Cited

U.S. PATENT DOCUMENTS

| | | | | |
|---|---|---|---|---|
| 7,344,279 | B2 * | 3/2008 | Mueller | F21V 29/83 |
| | | | | 362/240 |
| 7,525,254 | B2 * | 4/2009 | Lys | B60Q 1/2696 |
| | | | | 307/10.8 |
| 9,161,411 | B1 * | 10/2015 | Dunn | H05B 33/0845 |
| 2007/0030137 | A1 | 2/2007 | Masters et al. | |
| 2013/0234623 | A1 | 9/2013 | Brown et al. | |
| 2015/0228228 | A1 * | 8/2015 | Han | G09G 3/22 |
| | | | | 345/690 |

FOREIGN PATENT DOCUMENTS

WO     2013110052 A1    7/2013

* cited by examiner

*Primary Examiner* — Haissa Philogene

(57) ABSTRACT

A vehicle display illumination system includes a controller controlling a constant current source. The constant current source receives a variable voltage input and outputs multiple constant current channels to one or more light sources for the vehicle display. The controller is further operable to alter a color or brightness of the light sources in response to a change in status of another vehicle system, thereby providing an indication to the user of the change in status.

16 Claims, 4 Drawing Sheets

LED DRIVER FOR VEHICLE DISPLAY ILLUMINATION

CROSS-REFERENCE TO RELATED APPLICATION

This application is a continuation of U.S. patent application Ser. No. 14/273,799 filed on May 9, 2014 and is incorporated herein by reference.

TECHNICAL FIELD

The present disclosure relates generally to vehicle displays, such as instrument clusters, and more specifically to an illumination system for the same.

BACKGROUND

Automotive vehicles, such as cars, trucks and commercial vehicles, include multiple displays that provide fundamental operational information to a vehicle operator. In some examples, to provide better clarity and enhance visibility in low light conditions, the display is illuminated using a light source. The light source is disposed behind the display and the display is either transparent or semi-transparent. Coloration can be added to the illumination either through the use of colored light sources (such as a colored LED), or through tinting the transparent or semi-transparent material.

Often vehicles rely on a voltage drawn from an onboard vehicle battery or other power source to power the light source and provide the illumination. Certain vehicle operations can draw heavily from the vehicle power sources, dropping the voltage available to be provided to the light source. A drop in voltage, absent other offsetting changes, carries a corresponding drop in the current provided to the light source. As is understood by those of skill in the art, the brightness of the light emitted from the light source is dependent on the current provided to the light source, with a higher current resulting in brighter light emission.

Thus, the utilization of the vehicle power source as the voltage source for the light source illuminating the vehicle display can cause the vehicle display to dim or flicker when the voltage drawn from the power source is decreased due to other vehicle operations.

SUMMARY OF THE INVENTION

Disclosed is a vehicle display including a controller including a controller serial peripheral interface (SPI) connection, at least one constant current source having a current source SPI connection, wherein the controller SPI connection is communicatively coupled to the current source SPI connection, the at least one constant current source further comprising a plurality of output current channels, and the at least one constant current source including a voltage input connected to a variable voltage vehicle power source a plurality of light sources, wherein each of the light sources is connected to at least one of the plurality of output current channels, and wherein the controller includes a memory storing instructions operable to cause the controller to alter an output current on at least one of the output current channels thereby altering at least one of a brightness and a color of a corresponding light source in response to a received status from another vehicle system.

Also disclosed is a method for illuminating a vehicle display including receiving a variable voltage at a variable voltage input of a constant current source, receiving a current channel control signal at a serial peripheral interface (SPI) connection of the constant current source, wherein the current channel control signal is operable to set an output current magnitude on each of a plurality of output current channels of the constant current source, outputting a constant current on at least one of a plurality of constant current output channels, and altering an output current on at least one of the output current channels thereby altering at least one of a brightness and a color of a corresponding light source in response to the controller receiving a changed status from another vehicle system.

These and other features of the present invention can be best understood from the following specification and drawings, the following of which is a brief description.

DETAILED DESCRIPTION OF AN EMBODIMENT

Figure 1:
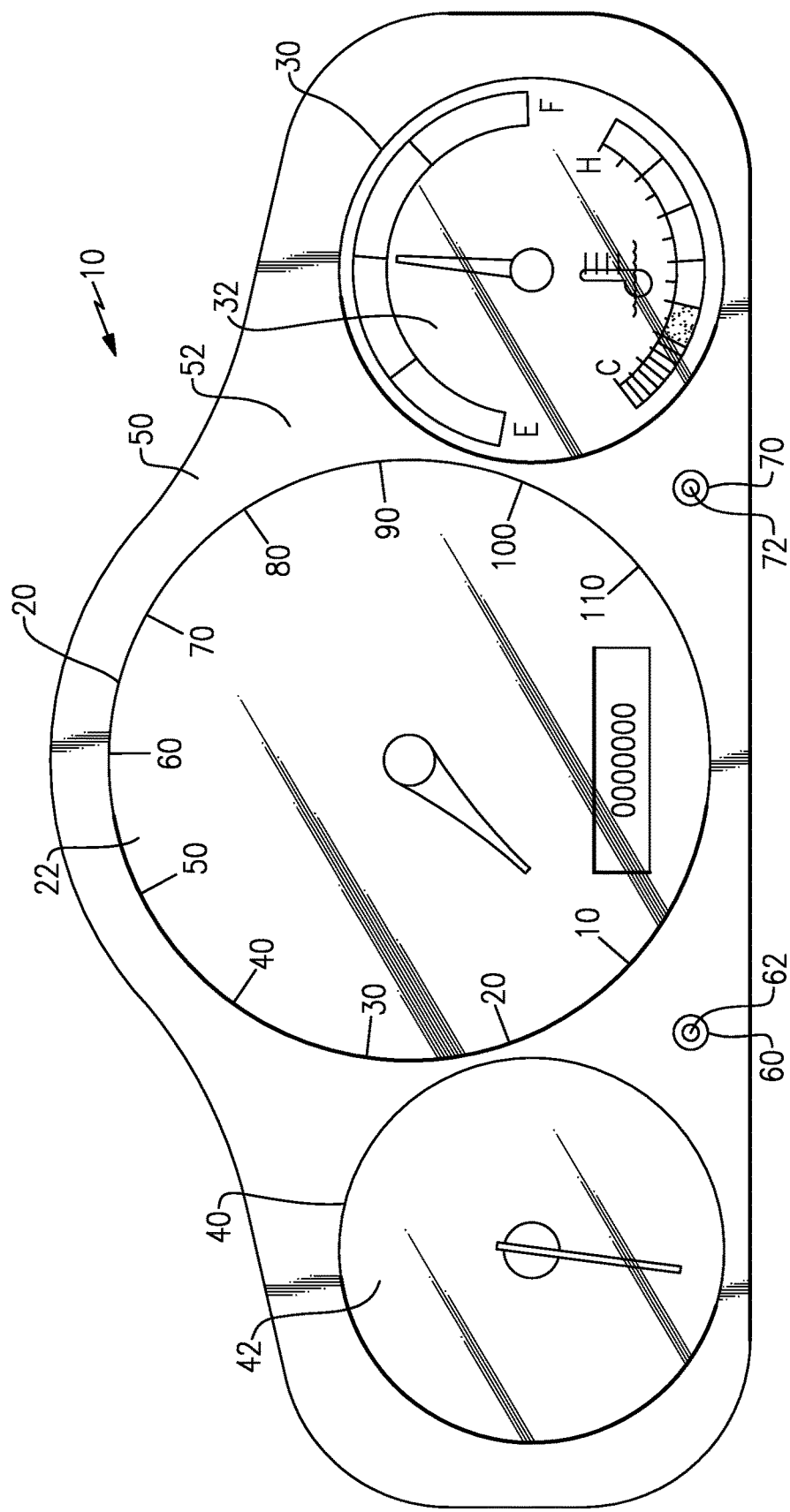
FIG. 1 schematically illustrates a vehicle instrument cluster.

FIG. 1 schematically illustrates a vehicle instrument cluster 10. The vehicle instrument cluster 10 includes three indicator dials 20, 30, 40 placed within a background placard 50. The first indicator dial 20 is a speedometer, and indicates the speed at which the vehicle is currently traveling. The second indicator dial 30 is a fuel gauge indicating the amount of fuel remaining in the vehicle's fuel tank. The third indicator dial 40 can be any indicator, such as a tachometer.

Each of the indicator dials 20, 30, 40 includes a central placard 22, 32, 42 that is printed on a transparent or semi-transparent material. In some examples, opaque numbering and other information can be printed on the surface of the placard 22, 32, 42. Light sources (illustrated in FIG. 2) are disposed behind the background placard 50 and illuminate the placard 50. In some cases the dial placards 22, 32, 42 and the background placard 52 are a single color semi-transparent material and the light from the light source illuminates the placard in that color. Alternatively a colored light from the light source 22, 32, 42 can be utilized and the colored light combines with the color of the placard 22, 32, 42 thereby causing the placard 22, 32, 42 to be illuminated in a different color.

Also disposed on the instrument cluster 10 are two buttons 60, 70, each of which includes an illuminated surface 62, 72. The buttons 60, 70 can be illuminated at all times, or only illuminated when toggled on. Alternately, the light source illuminating each of the buttons 60, 70 can cycle through various colors or brightness indicating a toggle state of a vehicle system controlled by the button 60, 70. While the illustrated instrument cluster 10 includes three dials 20, 30, 40 and two buttons 60, 70, it is understood that any alternate number of dials and buttons may be utilized to communicate information to the vehicle operator. Furthermore, the dials 20, 30, 40 and buttons 60, 70 may be re-arranged in any manner, as needed by a given design.

Figure 2:
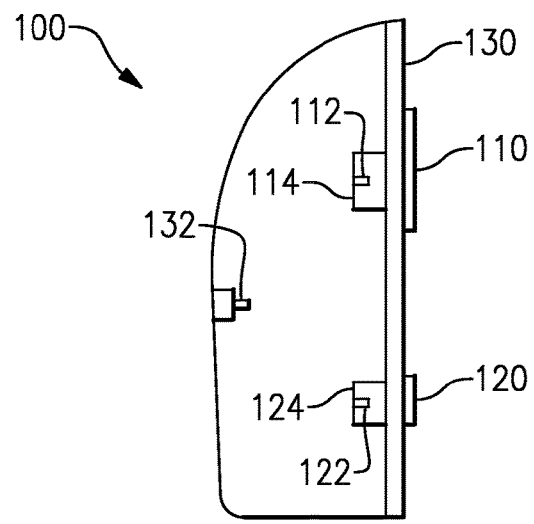
FIG. 2 schematically illustrates a side view of a vehicle display.

With continued reference to FIG. 1, FIG. 2 illustrates a side view of a simplified example vehicle display 100. The simplified example vehicle display 100 includes a dial 110 and a button 120, each of which are disposed on a background placard 130. The dial 110 is illuminated by a light source 112 contained in a dedicated light housing 114. Similarly, the button 120 is illuminated by a light source 122 contained in a dedicated light housing 124. A third light source 132 illuminates the background placard 130.

Each of the light sources 112, 122, 132 receives power from a vehicle power source, such as a battery. The power from the vehicle power source is provided to each of the light sources through a constant current source that converts the supplied voltage into an output current. A single constant current source can include multiple output currents, referred to as output channels, with each of the output channels providing a constant current to one of the light sources 112, 122, 132. The magnitude of the current output on each channel and provided to the corresponding light sources 112, 122, 132 is adjustable and controls the brightness of the light source 112, 122, 132. In this way, a controller controllably connected to the constant current source can adjust the brightness of each light source independently, and maintain a desired brightness despite variations in the voltage provided from the vehicle power source.

In the illustrated example of FIG. 2, the light source 122 illuminating the button 120 is a multi-colored LED, such as a Red/Green/Blue (RGB) LED. The multi-colored LED utilizes three current channels, each of which provides a distinct current to corresponding portion of the multi-colored LED. In practical applications, multi-colored LEDs are structured as three LEDs each of a different color all of which are contained in a single LED package. When the colors are illuminated at varying brightness, colors in a wide spectrum can be formed from the combined colors and brightness of the light emitted from the three colored LED's. Thus, the magnitude of current provided from the constant current source to the three LEDs in the light source 122 controls not only the brightness, but the color of the light emitted as well. Variations in the current provided to the multi-colored LED can cause variations in the emitted color as well as in the brightness.

The constant current source is, in turn connected to a controller by a data communication link. In some examples, the data communication link is a serial peripheral interface (SPI) link. The SPI link allows the controller to alter and adjust the currents provided by the constant current source, thus allowing the brightness and color of the light sources 112, 122, 132 to be maintained and to be controlled. The controller is similarly interfaced with other vehicle systems, thereby allowing the controller to alter brightness or color of the light emitted by the light sources to provide further indications beyond a simple binary on/off toggle.

By way of example, the button 120 can be illuminated in varying colors depending on a state of the corresponding system (Full on, Partial on, off, etc.). The varied colors or brightness can also indicate high priority information, or dangerous conditions. In such an example the button or dial corresponding to the high priority information can be illuminated in a red color by adjusting the corresponding current magnitudes in the multi-colored LED when a certain condition is met, an a different color under other conditions.

Figure 3:
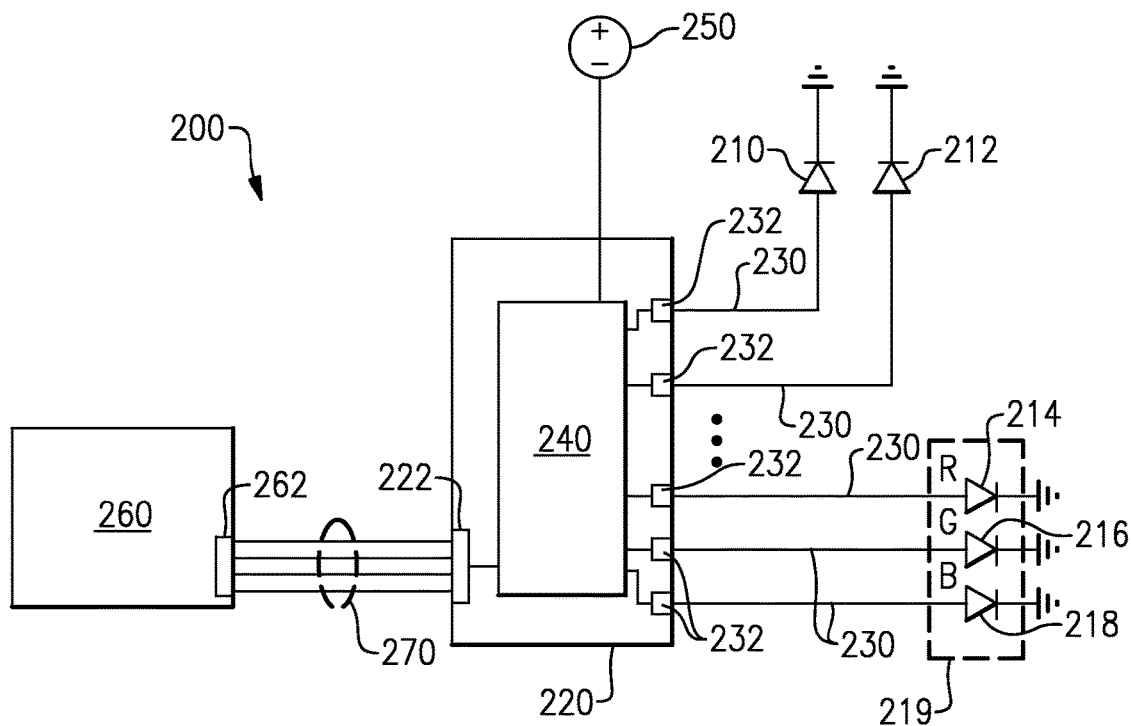
FIG. 3 schematically illustrates a controlled brightness arrangement for multiple vehicle display light sources.

With continued reference to FIGS. 1 and 2, FIG. 3 illustrates an example circuit 200 capable of providing a constant current at a desired magnitude to light sources 210, 212, 214, 216, 218 within a vehicle display, or in multiple vehicle displays. By way of example, the circuit 200 of FIG. 3 can be used to control the illumination of the vehicle displays of FIGS. 1 and 2.

Each of the light sources 210, 212, 214, 216, 218 is connected to a constant current source 220 via at least one current channel 230. The constant current source 220 includes multiple channel outputs 232, each of which connects one corresponding constant current channel 230 to a constant current conversion circuit 240. The constant current conversion circuit 240 is connected to a vehicle power supply 250, such as the vehicle battery. The vehicle power supply 250 powers the constant current circuitry 240. In one example, the constant current source is a flexible input/output integrated circuit.

The vehicle power supply 250 provides a variable voltage to the constant current conversion circuitry 240. In other words, the voltage provided to the constant current source 220 by the vehicle power supply 250 depends on the operations of other vehicle systems and the amount of voltage available from the power supply 250. The provided voltage will fall within a range of voltages, with the maximum and minimum bounds of the range being determined by the power draw of the vehicle systems connected to the power source. The constant current conversion circuitry 240 converts the variable voltage value into a constant current output and outputs the constant current to the light sources 210, 212, 214, 216, 218. Each current channel 230 is independent of each other of the current channels 230, and the constant current conversion circuitry 240 is capable of outputting a unique constant current value to each of the connected current channels 230.

A controller 260 is connected to the constant current source 220 via a serial peripheral interface (SPI) connection 270. To facilitate the SPI connection 270, the controller 260 includes an SPI connection 262, and the constant current source 220 includes an SPI connection 222. The controller 260 is designated the SPI master, and the controlled constant current circuit 220 is the designated SPI slave. The current values output by each of the current channels 230 are controlled by the controller 260 through the SPI connection 270. The control connection, in turn, allows the controller 260 to control the brightness of each of the light sources 210, 212, 214, 216, 218 by controlling the output current.

With specific regards to light sources 210, 212, 214, 216, 218, the light sources include a red LED 214, a green LED 216 and a blue LED 218, with each of the red, green and blue LEDs 214, 216, 218 arranged as a single multi-colored LED 219. As described above the specific color of the light emitted from the multi-color LED 219 is determined by the particular brightness of each of the red LED 214, the green LED 216, and the blue LED 218.

The controller 260 is interfaced with other systems within the vehicle using any known interfacing technique. As a result of interfacing with the other vehicle systems, the controller 260 can receive and interpret statuses and conditions of other vehicle systems within the vehicle. The controller 260 can then determine an appropriate color for a multicolored LED 219 or brightness for a standard LED 210, 212, to communicate the corresponding information to the vehicle operator. This new brightness or color is converted into a corresponding output current for the current channel 230 providing current to the appropriate light source 210, 212, 214, 216, 218. The constant current source is informed by the controller 260, via the SPI connection 270, what the new current output on the given current channel 230 (or channels) should be.

In this way the controller 260 can alter the appearance of the light emitted from the light sources 210, 212, 214, 216, 218 to communicate information to the vehicle operator, depending on the particular status of the corresponding vehicle system.

Figure 4:
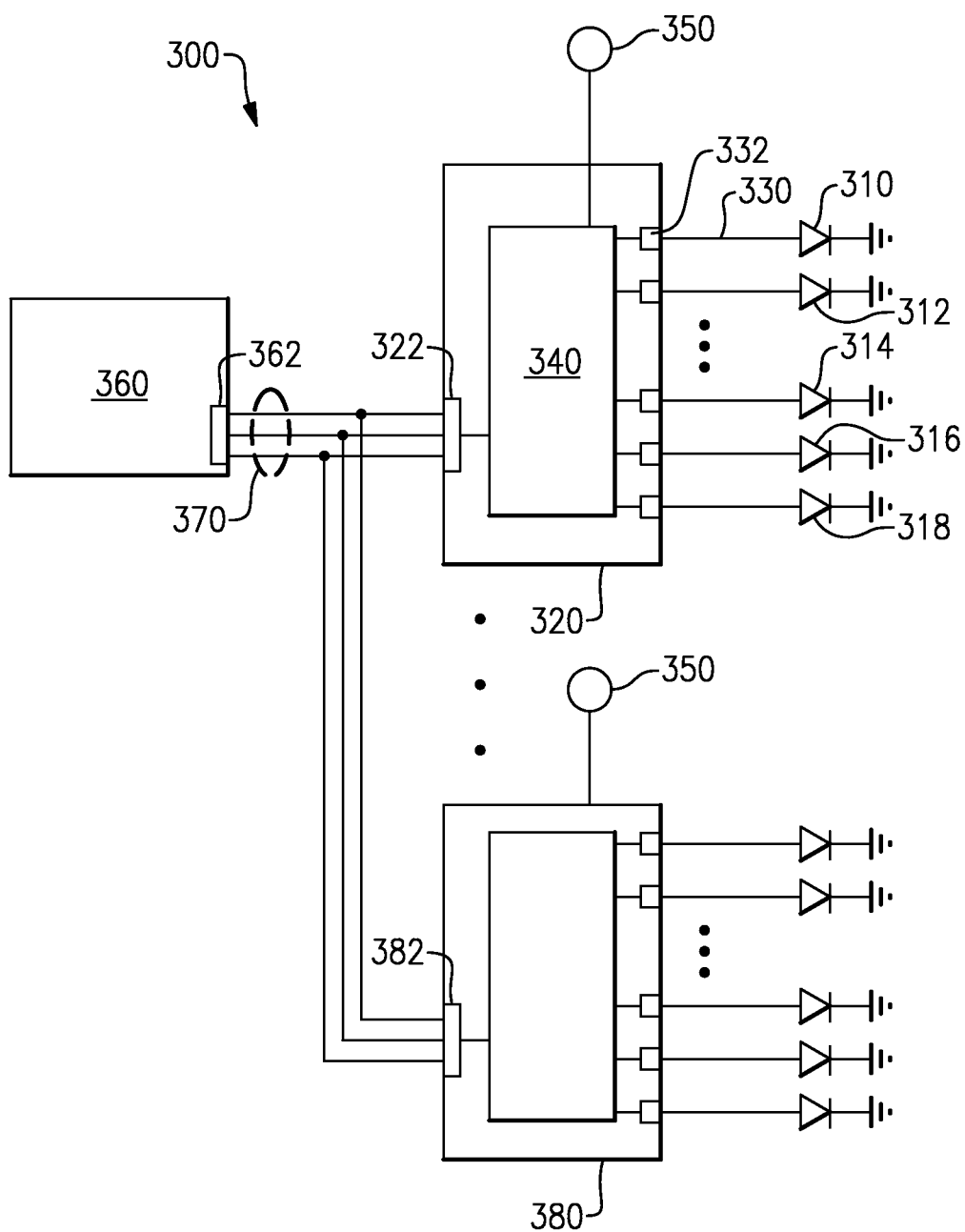
FIG. 4 schematically illustrates an alternate controlled brightness arrangement for multiple vehicle.

With continued reference to FIG. 3, FIG. 4 illustrates an alternate example circuit 300 capable of providing a constant current at a desired magnitude to light sources 310, 312, 314, 416, 318. As with the example of FIG. 3, each of the light sources 310, 312, 314, 316, 318 is connected to a constant current source 320 via a dedicated current channel 330. The dedicated constant current channels 330 are connected to a constant current circuitry 340 via a channel output 332 corresponding to each constant current channel 330. The constant current circuitry 340 is fed from a vehicle power source 350, such as a battery, that outputs a variable voltage to the constant current source 340. The operations of the constant current source 320 are controlled via a controller 360 that is controllably coupled to the constant current circuitry 340 via a SPI interface 370, with each of the controller 360 and the constant current source 320 having a corresponding SPI connection 322, 362.

In the alternative circuit 300 of FIG. 4, a second constant current circuit 380 is connected to the controller 360 via the SPI connection 370. The second constant current source 380 is daisy chained off of the SPI connection 370 and provides constant current control inputs to the second constant current source 380 via an SPI connection 382. In further alternate examples, additional constant current sources can be daisy chained to allow a single controller 360 to control multiple constant current sources beyond the two illustrated constant current sources 320, 380. As with the example of FIG. 3, the controller is configured as a SPI master, and each of the constant current sources 320, 380 is configured as an SPI slave to facilitate proper SPI control.

The second constant current circuit 380 is substantially similar to the first constant current circuit 340, and operates in a similar manner. While illustrated as drawing power from the same power source 350, one of skill in the art having the benefit of this disclosure will understand that each of the constant current sources 320, 380 could draw power from different power sources without requiring significant modifications to the design. The daisy chaining of further constant current sources 320, 380 to a single controller 360. In some practical examples, each constant current source 320, 380 has a limited number of available current channels that can be utilized. By way of example, a flexible Input/output Integrated Circuit can be used as the constant current source 320, 380 and may be limited to sixteen output channels. By daisy chaining the constant current sources, additional current channels beyond those enabled by a single constant current source can be utilized.

While described herein in the context of a vehicle instrument cluster, it is understood that the multi-colored LED illumination can be applied to any vehicle display and is not limited to vehicle displays contained in an instrument cluster.

Figure 5:
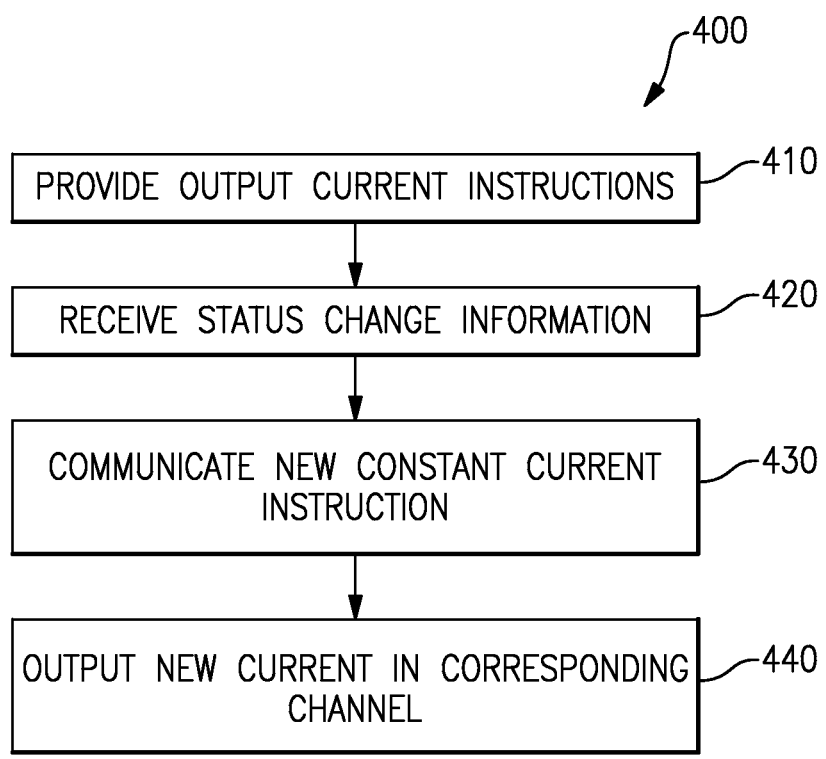
FIG. 5 illustrates a method for controlling a brightness and color of a light source for a vehicle display.

FIG. 5 illustrates a general example process 400 that is facilitated by the structures illustrated in FIGS. 1-4. Initially, the controller 260, 360 sends an output current instruction to the constant current circuit 220, 320, 380 defining the desired output current for each current channel 230, 330 of the constant current circuits 220, 320 in a "Provide output current instructions" step 410. The initial output current provided is a default brightness and color for each of the corresponding light sources 210, 212, 214, 216, 218, 310, 312, 314, 416, 318. The controller 260, 360 also polls vehicle systems to determine a status of any vehicle system that requires a change in the illumination. In alternate systems, the controller 260, 360 can be configured to passively receive information originating from other vehicle systems rather than actively polling for the information.

When one of the vehicle systems indicates a change in status, such as a button toggle, that should be indicated to the vehicle operator, the controller 260, 360 receives the status change information in a "receive status change information" step 420. Based on the particular status change information, the controller 260, 360 determines a new output current instruction for the corresponding light source 210, 212, 214, 216, 218, 310, 312, 314, 416, 318, or light sources. The new output current instruction is, in the example of a multi-colored LED, an alteration of the color emitted from the multi-colored LED. In alternate examples, the alteration can be a change in brightness to either emphasize or deemphasize a particular vehicle display. The controller 260, 360 then communicates the newly determined output current instructions to the corresponding constant current circuit 220, 320, 380 in a "communicate new constant current instruction" step 430.

The corresponding constant current source 220, 320, 380 receives the new constant current instruction and alters the constant current output of the corresponding channel in a output new current in corresponding channel step 440. The affect of outputting the new constant current is to alter the brightness or color of the corresponding light source 210, 212, 214, 216, 218, 310, 312, 314, 416, 318 and thereby either draw attention to, or draw attention away from, the vehicle display illuminated It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A vehicle display illumination system comprising:
    a controller including a controller data communication link;
    at least one constant current source having a current source data communication link, wherein the controller data communication link is communicatively coupled to the current source data communication link, the at least one constant current source further comprising a plurality of output current channels, and the at least one constant current source including a voltage input connected to a variable voltage vehicle power source;
    a plurality of light sources, wherein each of said light sources is connected to at least one of said plurality of output current channels; and
    wherein said controller includes a memory storing instructions operable to cause the controller to alter an output current on at least one of said output current channels thereby altering at least one of a brightness and a color of a corresponding light source in response to a received status from another vehicle system.

2. The vehicle display illumination system of claim 1, wherein at least one of said plurality of light sources is a multi-colored LED, and wherein said multi-colored LED is connected to said constant current source via at least three output current channels.

3. The vehicle display of claim 2, wherein said at least one constant current source comprises two or more constant current sources, and wherein each of said constant current sources is controllably coupled to said data communication link.

4. The vehicle display illumination system of claim 3, wherein each of said constant current sources is daisy chained to a single data communication link output.

5. The vehicle display illumination system of claim 1, wherein said variable voltage vehicle power source is a vehicle battery.

6. The vehicle display illumination system of claim 1, wherein at least one of said plurality of light sources is disposed within a vehicle instrument cluster.

7. The vehicle display illumination system of claim 1, wherein said controller is designated an data communication master device, and each of said at least one constant current sources is designated a slave data communication device.

8. The vehicle display illumination system of claim 1, wherein the data communication link is a serial communication link.

9. A method for illuminating a vehicle display comprising:
receiving a variable voltage at a variable voltage input of a constant current source;
receiving a current channel control signal at a data communication link of said constant current source;
outputting a constant current on at least one of a plurality of constant current output channels; and
altering an output current on at least one of said output current channels thereby altering at least one of a brightness and a color of a corresponding light source in response to said controller receiving a changed status.

10. The method of claim 9, wherein altering an output current on at least one of said output current channels thereby altering at least one of a brightness and a color of a corresponding light source in response to said controller receiving a changed status comprises altering an output of at least one current channel providing current to a multi-color light source.

11. The method of claim 9, wherein altering an output current on at least one of said output current channels thereby altering at least one of a brightness and a color of a corresponding light source in response to said controller receiving a changed status comprises altering an output of a single current channel providing current to a mono-colored light source.

12. The method of claim 9, wherein receiving a current channel control signal at a data communication link connection of said constant current source further comprising receiving a current channel control signal output from said controller at each of a plurality of constant current sources.

13. The method of claim 12, where each of said plurality of constant current sources are daisy chained to an output of a data communicatoin channel link connection of said controller.

14. The method of claim 10, wherein receiving a variable voltage at a variable voltage input of a constant current source comprises receiving a non-zero voltage within a range of voltages, and wherein said received voltage varies over time.

15. The method of claim 14, wherein a current output on each of said constant current channels is constant and is independent of the voltage input.

16. The method of claim 9, wherein altering an output current on at least one of said output current channels thereby altering at least one of a brightness and a color of a corresponding light source in response to said controller receiving a changed status comprises notifying a vehicle operator of a change in status of a vehicle system by altering an illumination of a corresponding vehicle display.

* * * * *